(12) United States Patent
Prasanna et al.

(10) Patent No.: US 12,120,608 B2
(45) Date of Patent: Oct. 15, 2024

(54) TIME SYNCHRONIZATION IN WIRELESS NETWORKS

(71) Applicant: ARINC Incorporated, Annapolis, MD (US)

(72) Inventors: Ramamurthy Prasanna, Bengaluru (IN); Kiran Thupakula, Bangalore (IN); Mahadevanna Shreshthi, Bangalore (IN)

(73) Assignee: ARINC Incorporated, Annapolis, MD (US)

( * ) Notice: Subject to any disclaimer, the term of this patent is extended or adjusted under 35 U.S.C. 154(b) by 543 days.

(21) Appl. No.: 17/474,814

(22) Filed: Sep. 14, 2021

(65) Prior Publication Data

US 2023/0032215 A1 Feb. 2, 2023

(30) Foreign Application Priority Data

Jul. 27, 2021 (IN) .............................. 202141033728

(51) Int. Cl.
*H04W 52/02* (2009.01)
*H04W 12/06* (2021.01)
*H04W 56/00* (2009.01)

(52) U.S. Cl.
CPC ....... *H04W 52/0209* (2013.01); *H04W 12/06* (2013.01); *H04W 56/001* (2013.01)

(58) Field of Classification Search
CPC ............. H04W 52/0209; H04W 12/06; H04W 56/001; Y02D 30/70
See application file for complete search history.

(56) References Cited

U.S. PATENT DOCUMENTS

| | | | |
|---|---|---|---|
| 7,688,802 B2 | 3/2010 | Gonia et al. | |
| 7,817,616 B2 | 10/2010 | Park et al. | |
| 7,826,818 B2 | 11/2010 | Gollnick et al. | |
| 8,478,314 B2 | 7/2013 | Chung et al. | |
| 9,119,185 B2 | 8/2015 | Huang et al. | |
| 10,666,498 B2 | 5/2020 | Das et al. | |
| 10,848,302 B2* | 11/2020 | Das | H04W 4/40 |
| 2007/0171859 A1* | 7/2007 | Brahmbhatt | H04L 63/0492 370/328 |
| 2009/0207769 A1 | 8/2009 | Park et al. | |
| 2011/0002251 A1 | 1/2011 | Shin et al. | |
| 2016/0037449 A1 | 2/2016 | Raghu et al. | |
| 2016/0088557 A1 | 3/2016 | Kwon et al. | |
| 2016/0182432 A1 | 6/2016 | De et al. | |

(Continued)

OTHER PUBLICATIONS

Extended Search Report in European Application No. 22156625.0 dated Oct. 14, 2022, 13 pages.

*Primary Examiner* — Brandon J Miller
(74) *Attorney, Agent, or Firm* — Sulter Swantz IP (57) ABSTRACT

Systems and methods are described for time synchronization and message scheduling among network elements involving wireless nodes, data controllers, and a network manager. The network manager provides configuration information for the data controllers and the wireless nodes. The wireless node includes a timing circuit with a duty cycle which is initially configured based on the configuration information. Subsequent to the initial configuration, the network manager schedules polling requests for the data controller to transmit to the wireless nodes based on a time at which sensor data is received from the wireless nodes, thereby correcting for timer drift.

19 Claims, 7 Drawing Sheets

(56) References Cited

U.S. PATENT DOCUMENTS

| | | |
|---|---|---|
| 2019/0334760 A1 | 10/2019 | Das et al. |
| 2020/0275373 A1* | 8/2020 | Hwang ............. H04W 52/0235 |
| 2020/0305229 A1* | 9/2020 | Jin ................... H04W 52/0222 |

* cited by examiner

TIME SYNCHRONIZATION IN WIRELESS NETWORKS

CROSS-REFERENCE TO RELATED APPLICATION

The present application claims the benefit of India Provisional Patent Application 202141033728, filed Jul. 27, 2021, titled TIME SYNCHRONIZATION IN WIRELESS NETWORKS, naming Prasanna Ramamurthy, Kiran Thupakula, and Mahadevanna Shreshthi as inventors, which is incorporated herein by reference in the entirety.

TECHNICAL FIELD

The present disclosure generally relates to methods and systems for wireless networks and more particularly for time synchronization and message scheduling.

BACKGROUND

Wireless sensor networks provide a number of benefits such as flexibility, scalability, or energy efficiency. In particular, the wireless sensor networks may be applied to various aircraft applications in the aerospace industry. The wireless sensor networks may support a variety of aircraft applications involving battery operated wireless sensor devices. Long battery life is a key design driver for such applications which drives power saving options.

Precise time synchronization between the wireless nodes and the wireless communication coordinators is essential for effective message scheduling to achieve seamless and reliable communication among network elements. Variable time drifts in the device clocks, especially the nano-power timing circuit of the battery powered wireless nodes, makes time synchronization process complicated in low data rate and low duty cycle operations. When the disconnected wireless nodes attempt to reconnect to the network, the reconnect mechanism and message scheduling are not handled due to the loss of synchronization with respect to the master clock. Poor time synchronization among the network elements leads to data loss and unreliable communication performance. Hence, there is a need to improve the quality of time synchronization in these networks while meeting the stringent energy conservation requirements. Therefore, it would be advantageous to provide a device, system, and method that cures the shortcomings described above.

SUMMARY

A wireless sensor network is described, in accordance with one or more embodiments of the present disclosure. In one embodiment, the wireless sensor network includes a wireless node. In another embodiment, the wireless node includes a sensor, a transceiver, a battery, and a timing circuit. In another embodiment, the timing circuit includes a duty cycle. In another embodiment, the duty cycle includes a sleep duration during which the wireless node is in a low-power state and a wake duration during which the wireless node is in an active state. In another embodiment, during the active state the wireless node is configured to receive a polling request by the transceiver, generate sensor data by the sensor, and transmit the sensor data by the transceiver. In another embodiment, the wireless sensor network includes a data controller. In another embodiment, the data controller includes a reference clock. In another embodiment, the data controller is configured to transmit a plurality of polling requests to the transceiver of the wireless node. In another embodiment, the plurality of polling requests include the polling request received by the transceiver during the active state. In another embodiment, the plurality of polling requests are transmitted according to a polling request schedule. In another embodiment, the data controller is further configured to receive the sensor data transmitted by the transceiver and generate a receipt time for the sensor data by the reference clock. In another embodiment, the wireless sensor network includes a network manager. In another embodiment, the network manager is configured to bi-directionally communicate with the data controller. In another embodiment, the network manager is further configured to transmit a first configuration message to the data controller for initializing the data controller and the wireless node. In another embodiment, the network manager is further configured to adaptively generate the polling request schedule for the plurality of polling requests based on at least the receipt time, the sleep duration of the wireless node, and a tolerance of the timing circuit.

A method is described, in accordance with one or more embodiments of the present disclosure. In one embodiment, the method includes, transmitting, to a data controller, a first configuration message from a network manager and an association request from a wireless node. In another embodiment, the first configuration message includes at least a wireless node identification, a wake duration, and a sleep duration. In another embodiment, the method includes, authenticating, by the data controller, the wireless node based on the wireless node identification and the association request. In another embodiment, the method includes, transmitting a second configuration message from the data controller to the wireless node. In another embodiment, the second configuration message includes at least the wake duration and the sleep duration. In another embodiment, the method includes configuring a duty cycle of a timing circuit of the wireless node based on at least the wake duration and the sleep duration. In another embodiment, the wireless node is in a low-power state during the sleep duration. In another embodiment, the wireless node is in an active state during the wake duration. In another embodiment, the method includes transmitting an acknowledgement message from the wireless node to the data controller.

A method is described, in accordance with one or more embodiments of the present disclosure. In one embodiment, the method includes generating, by a network manager, a polling request schedule. In another embodiment, the polling request schedule is based on at least a receipt time at which sensor data is received by the data controller from a wireless node, a sleep duration of a timing circuit of the wireless node, and a tolerance of the timing circuit. In another embodiment, the method includes transmitting a plurality of polling requests from the data controller to the wireless node. In another embodiment, the plurality of polling requests are transmitted according to the polling request schedule. In another embodiment, the method includes receiving, to the wireless node, a polling request of the plurality of polling requests during an active state of the wireless node. In another embodiment, the method includes transmitting, to the data controller from the wireless node, the sensor data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Broadly the present disclosure is directed to a wireless sensor network (WSN). The wireless sensor network may support applications involving battery operated wireless sensors, such as, aircraft applications. Power saving options like low duty cycle operation and nano-power timing circuits may improve a battery life of the wireless sensors. In some embodiments, the timing circuit is an analog circuit. The timing circuit may include a provision for configuring duty cycle settings. Time synchronization is provided to achieve reliable communication in the wireless sensor network. Variable time drift in the nano-power timing circuit is accounted for to improve the time synchronization in such low data rate and duty cycle operations. Time synchronization may occur through exchange of configuration data among the network elements during a configuration phase and data polling and adaptive message scheduling in a communication phase. Such time synchronization may improve a communication reliability in the wireless sensor networks. Clock synchronization and group-based time slot management. Methods for time synchronization may be adaptive to dynamic changes in the network configuration of a network scale and wireless node data rate. By adapting the polling requests, a reduction in radio frequency emissions and channel congestion may be provided. Such reduction in congestion may support scalability of the network for additional wireless nodes. Algorithms are also described to time re-synchronize network elements that lose synchronization during longer operation. Thus, the wireless sensor network may support low data rate, low duty cycle operation of wireless nodes with nano-powered timers.

Figure 1:
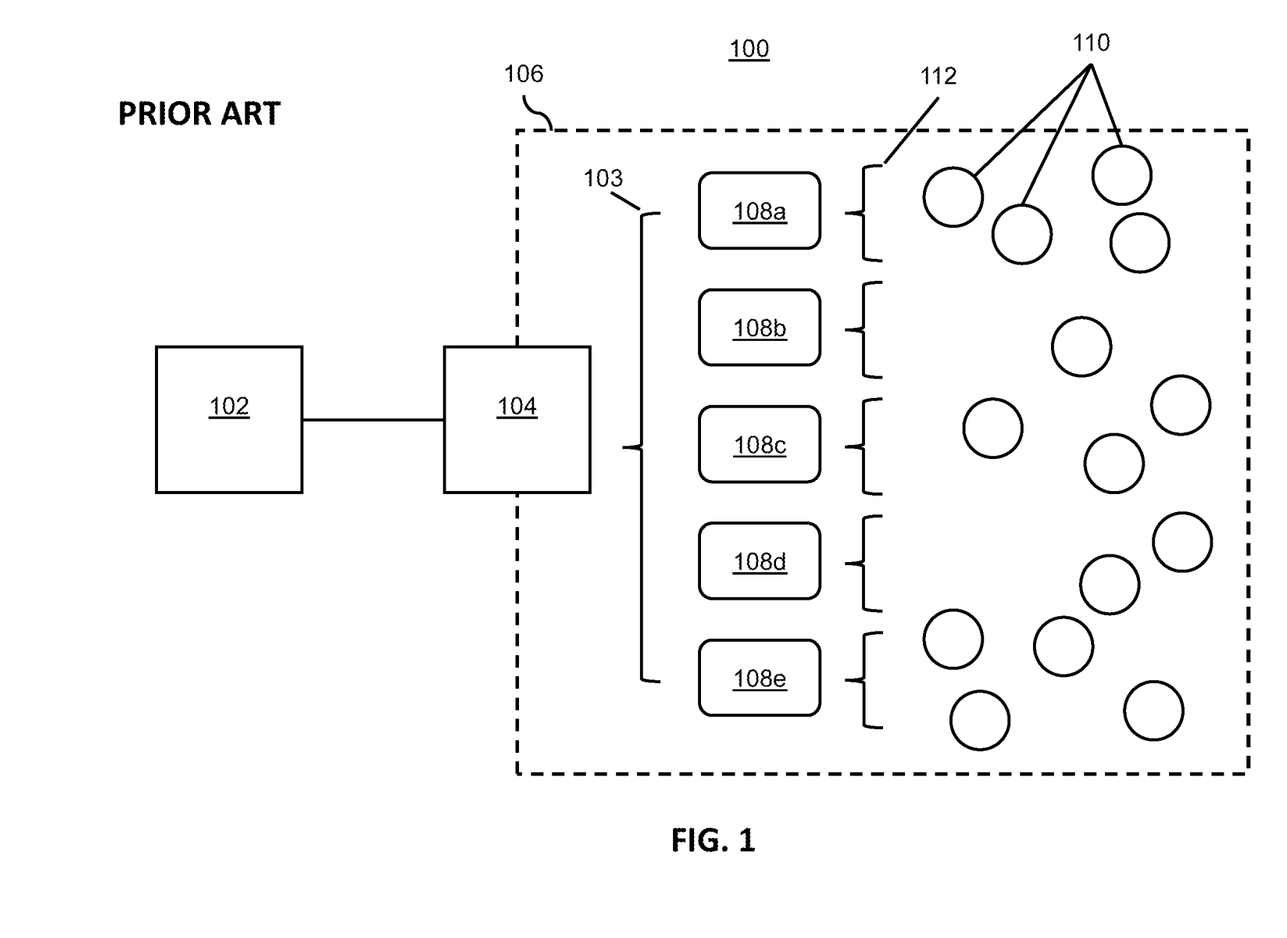
FIG. 1 depicts a block diagram of a wireless network architecture 100, in accordance with one or more embodiments of the present disclosure.

Referring now to FIG. 1, an architecture 100 for wireless avionics networks is described, in accordance with one or more embodiments of the present disclosure. An Architecture for Wireless Avionics Communication Network is described in U.S. Pat. No. 10,666,498, which is incorporated herein by reference in the entirety. The architecture provided therein may include a fault-tolerant design with a hierarchical topology.

The architecture 100 may include several aircraft applications 102. The aircraft applications 102 can include applications such as Integrated Vehicle Health Management (IVHM), Engine Health Management (EHM), System Health Management (SHM), Prognostics and Health Management (PHM), data loggers, or others.

At a first layer of the architecture 100, a network manager 104 is configured to communicate with external applications such as the aircraft applications 102 and a network 106. The network manager 104 may be configured for bi-directional communication 103 with the data controllers 108a-108n over a wired connection or wireless connection.

A second layer includes one or more data controllers 108a-108n. The data controllers 108 may be configured for bi-directional communication with the network manager 104. The data controllers 108 may also be configured for bi-directional communication with wireless nodes 110 by a wireless connection. The data controllers 108 are capable of synchronous and asynchronous communication. Also, the data controllers 108 are capable of aggregating/consolidating the data received from the wireless nodes 110 and transmitting the aggregated data to the network manager 104. The data controllers 108 may also be configured with receive queues/buffers to buffer data that is received at various data rates.

A third layer of the architecture 100 includes one or more wireless nodes such as wireless nodes 110. The wireless nodes 110 are configured for bi-directional communication with the data controllers 108 by a transceiver of the wireless node 110. The wireless nodes 110 are configured to transmit and receive data at different rates and priorities. In addition, the wireless nodes 110 can be grouped into different clusters 112 that are associated with respective wireless data controllers 108 by various techniques. The wireless nodes 110 may include devices such as but not limited to wireless sensor nodes, wireless actuator nodes, and the like. The wireless nodes 110 may communicate with the data controllers 108 over wireless channels of communication on a specified bandwidth. The wireless nodes 110 may be battery powered. Such battery power may be advantageous where the wireless nodes 110 are located in a location which not easily accessible, such as, an exterior sensor on an aircraft hull.

The data controller 108 forms the sensor cluster 112 and manages a finite set of wireless nodes 110 in that sensor cluster 112. An aircraft may provide the power to network manager 104 and data controller 108. The wireless nodes 110 may be battery powered.

The wired connection may include any wireline communication protocol (e.g., DSL-based interconnection, cable-based interconnection, T9-based interconnection, and the like) known in the art. Similarly, the wireless connections may include any communication protocol (e.g., GSM, GPRS, CDMA, EV-DO, EDGE, WiMAX, 3G, 4G, 4G LTE, 5G, Wi-Fi protocols, RF, Bluetooth, and the like) known in the art.

Referring now to one or more embodiments of the present disclosure. The embodiments and the enabling technologies described in the context of the system 100 should be interpreted to extend to various processes or method described herein, such as, but not limited to, the sequence diagram 200, the sequence diagram 300, the sequence diagram 400, the sequence diagram 500, or the sequence diagram 600. It is further recognized, however, that the processes and methods described herein are not limited to the system 100.

The network manager 104 may establish the network 106 and wait for the incoming data controller 108 connections. The data controller 108 connects to the network manager 104 when the data controller 108 discovers the network manager 104 in the network 106. The data controller 108 then receives a configuration message from the network manager 104. The wireless node 110 may attempt to associate to the data controller 108 referring to a preconfigured data controller 108 coordinators list. The wireless node 110 associates to the data controller 108 if available and receives the configuration message which includes a duty cycle configuration.

The wireless nodes 110 may include a duty cycle. The duty cycle may include an active state. During the active state various components of the wireless node may be powered for full operational capability. Such components may include, but are not limited to, the timing circuit, the sensor, and/or the transceiver. The duty cycle may also include a low-power state. During the low-power state a transceiver and a sensor of the wireless node may be unpowered, such that, a power consumption of a battery of the wireless node 110 may be reduced. The duty cycle of the wireless nodes 110 may be relatively low (on the order of once per minute, or once per several minutes), such that the wireless nodes 110 may be in the low-power state for a sleep duration sleep and an active state for a wake duration. During the wake duration, the wireless nodes 110 may wait for incoming polling requests. Upon receiving the polling requests, the wireless nodes 110 may send a data sample and then transition to sleep. The wireless nodes 110 may transition to sleep as per a fixed or a variable wake cycle configuration.

The duty cycle may be based on a timing circuit of the wireless node 110. The duration of the active state may be based on the wake duration of the timing circuit. Similarly, the duration of the low-power state may be based on the sleep duration of the timing circuit. In some embodiments, the sleep duration and the wake duration may be configurable. Such configuration may be provided by the configuration message from the data controller 108. The timing circuit may be configured according to the sleep duration and the wake duration during an initial association of the wireless node 110 with the network 106 or during a reassociation of the wireless node 110.

The timing circuit may not include a memory to store an absolute time. Instead, the duty cycle may be set by passive components of the timing circuit, such as, resistors, capacitors, inductors, and one or more switches of the timing circuit. By the switches, the duty cycle of the wireless node 110 may be configured initially during the association. In some embodiments, the timing circuit of the wireless nodes 110 includes a nano-power timing circuit. In this regard, during the low-power state, the nano-power timing circuit uses less than one-thousand nanowatts of power during the low-power state. This may be advantageous for prolonging the battery life of the wireless node 110.

The timing circuit may include a clock drift. Over time, the clock drift may accumulate such that the wireless node 110 becomes desynchronized with a reference clock, such as, but not limited to, a reference clock of the network manager 104 or the data controller 108. In some embodiments, the network manager 104 may accommodate for the clock drift of the timing circuit by adaptive scheduling of polling requests for the data controller 108 to transmit to the wireless node 110. As the wireless nodes 110 operate, the network manager 104 may be provided with information about the sleep duration and wake duration of the wireless nodes 110. This information may allow the network manager 104 to schedule the synchronized data polling request message. This coordination may be performed at the first association and during subsequent polling requests.

Figure 2:
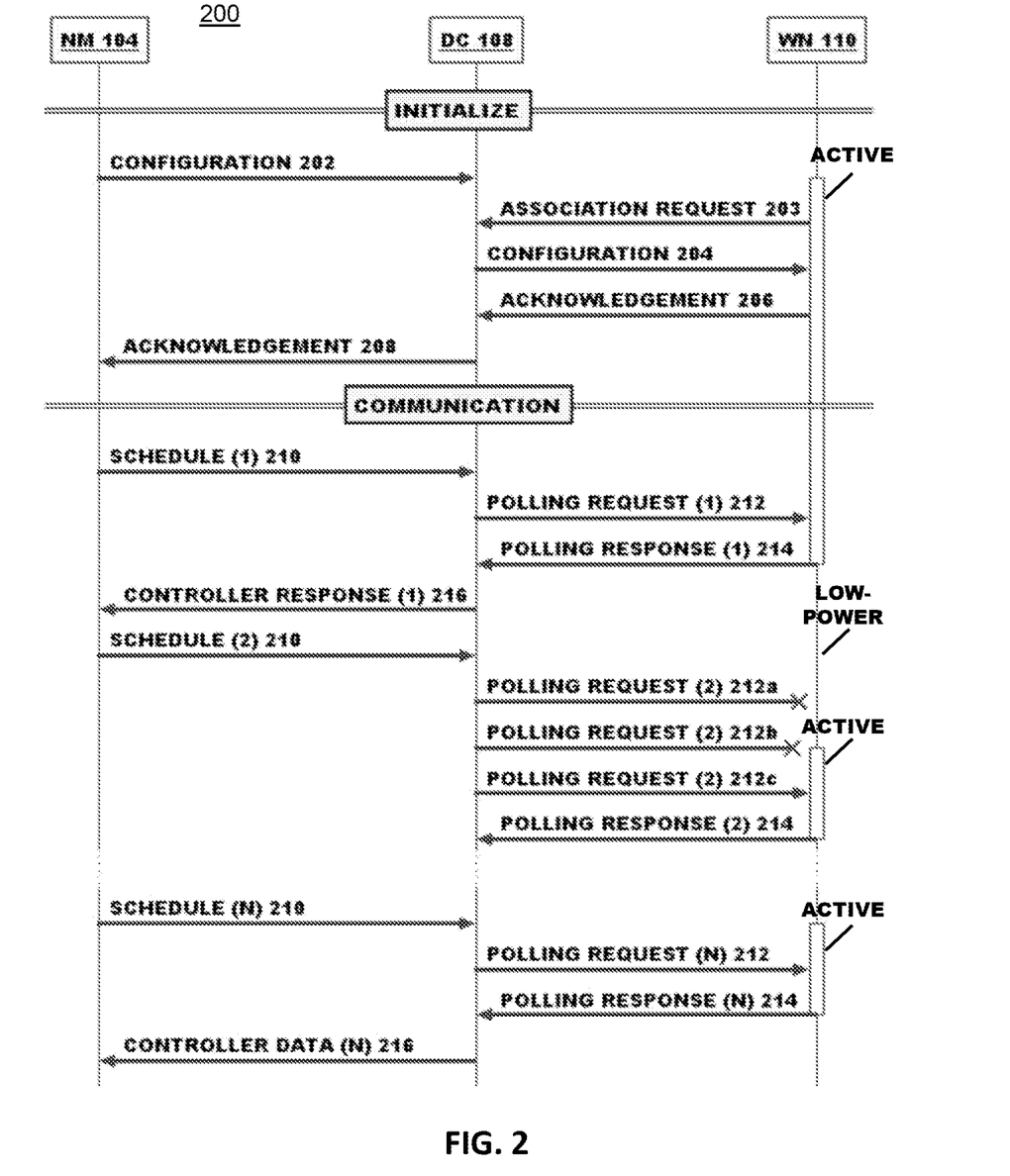
FIG. 2 depicts a sequence diagram 200 showing time synchronization and polling request scheduling, in accordance with one or more embodiments of the present disclosure.

Referring now to FIG. 2, a sequence diagram 200 is described in accordance with one or more embodiments of the present disclosure. The sequence diagram 200 may illustrate a method of time synchronization between network elements in an energy sensitive wireless sensor network.

During an initialization phase, the network elements may be time synchronized by sharing configuration parameters. The configuration parameters may be shared between the network manager 104, the data controller 108, and the wireless node 110. The configuration messages may be exchanged among the network elements during an initialization phase. The configuration parameters may include duty cycle information.

Furthermore, polling data and adaptive message scheduling may be exchanged among the network elements during a communication phase. Adaptive message scheduling may be performed by the network manager 104 to maintain time synchronization between the network elements. The network manager 104 may perform adaptive scheduling of polling requests sent from the data controller 108 to the wireless node 110. The adaptive scheduling of the data polling requests may be based on the duty cycle together with a previous response time from the wireless node 110. The schedule may also be based on a tolerance of the wireless node 110 timing circuit. The network manager 104 may synchronize the network elements, schedule the polling messages to align with wireless node 110 active states and handle out-of-sync network elements. Details of these algorithms are explained further herein.

A configuration message 202 may be sent from the network manager 104 to the data controller 108. The configuration message 202 may include configuration parameters, such as, but not limited to, a wireless node identification (ID), a cluster size, a sleep duration, or a wake duration, or a fixed/variable wake cycle. The wireless node identification may provide for authentication of the wireless nodes 110 for joining the cluster 112 of the data controller 108. The cluster size may limit the number of wireless nodes 110 eligible for joining the cluster 112 of the data controller 108. The sleep duration may be a sleep duration for one or more wireless nodes 110 of the cluster 112. The sleep duration may be used in message scheduling by the network manager 104 and for sleep operations by the wireless node 110. The wake duration may be a wake duration for one or more wireless nodes 110 of the cluster 112. The wake duration may be used in message scheduling by the network manager 104 and for wake operations by the wireless node 110. The fixed/variable wake cycle may be used in message scheduling by the network manager 104.

The data controller 108 may receive the configuration message 202 and configure the cluster 112 based on one or more of the configuration parameters (e.g., the cluster size). The data controller 108 may then wait for incoming association requests from the wireless nodes 110.

On power up, the wireless node 110 may perform a scan and send an association request 203 to the data controller 108. The association request 203 may include, but is not limited to, an identification of the wireless node 110. Although the association request 203 is depicted as being sent from the wireless node 110 to the data controller 108 after the data controller 108 receives the configuration message 202, this is not intended to be limiting. In some embodiments, the wireless node 110 sends the association request 203 to the data controller 108 and then the data controller 108 receives the configuration message 202. However, the data controller 108 may be unable to authenticate the wireless node 110 until after receiving both the configuration message 202, including the wireless node identification, and the association request 203.

The data controller 108 may receive the association request 203 and compare the association request 203 with the wireless node identifications in the cluster 112. Based on the comparison, the data controller 108 may send an association response to the wireless node 110. Upon determining the wireless node 110 is not authenticated to join the cluster 112, the association response sent from the data controller 108 to the wireless node 110 may include a rejection message (not depicted). Upon determining the wireless node 110 is authenticated to join the cluster 112, the association response sent from the data controller 108 to the wireless node 110 may include a configuration message 204. The configuration message 204 may include configuration parameters, such as, but not limited to, the sleep duration, the wake duration, or the fixed/variable wake cycle.

The wireless node 110 may receive the configuration message 204 and configure one or more components based on one or more of the configuration parameters. The wireless node 110 may configure the timing circuit based on the sleep duration and the wake duration. During the sleep duration, a power consumption of the wireless node 110 may be reduced, such that the transceiver and the sensor are unpowered. For example, where sensor of the wireless node 110 is a temperature sensor, the wireless node 110 may be configured with a sleep duration between fifteen and thirty minutes. During the wake duration, the transceiver and the sensor may be powered, such that the wireless node may receive data polling requests by the transceiver and generate sensor data by the sensor. Thus, the duty cycle of the wireless node 110 may be configured based on the configuration message 204.

Similarly, the timing circuit may be configured based on the fixed wake cycle or the variable wake cycle. Where the timing circuit is configured with the variable wake cycle, the wireless node 110 may transmit a data sample immediately upon receiving a data polling request and generating a sensor measurement. Where the timing circuit is configured with the fixed wake cycle, the wireless node 110 may transmit the data sample after receiving the data polling request, generating the sensor measurement, and waiting until the end of the wake duration.

Upon configuring the components, the wireless node 110 may transmit an acknowledgement message 206 to the data controller 108. The acknowledgement message 206 may include a confirmation that the wireless node 110 is configured according to the configuration parameters. The wireless data controller 108 may receive the acknowledgement message 206 from the data controller 108 at an acknowledgement receipt time. In some embodiments, subsequent to sending the acknowledgement 206, the node 110 may remain in an active state until after a first polling request 212 is received and a polling response 214 is transmitted (as depicted). In some embodiments, the node 110 may begin the low-power portion of the duty cycle immediately after sending the acknowledgement message 206 (not depicted).

The data controller 108 may then transmit an acknowledgement message 208 to the network manager 104. The acknowledgement message 208 may include a list of wireless nodes 110 in the cluster 112 of the data controller 108, and a confirmation that the wireless nodes 110 are configured according to the various configuration parameters. Adaptive message scheduling will then be handled in a communication phase.

The network manager 104 may receive the acknowledgement message 208 and initiate a scheduling algorithm. The network manager 104 may schedule a first series of data polling request messages to the wireless nodes 110 after receiving the acknowledgement for the configuration message. The scheduling algorithm may determine a polling request schedule 210. The polling request schedule 210 may be a time at which a series of polling requests may be sent from the data controller 108 to the wireless node 110. The polling request schedule 210 may be determined based on a sleep duration of the wireless node, a tolerance of the timing circuit, and a receipt time of a previous polling response. By the adaptive scheduling of the polling requests, the number of polling requests sent by the data controller 108 may be reduced. Reducing the number of polling requests sent by the data controller 108 may similarly reducing a channel congestion. The reduced channel congestion may increase a number of available wireless nodes able to communicate with the data controller 108 by the channel. The network manager 104 may transmit the first polling request schedule 210 to the data controller 108.

The data controller 108 may receive the polling request schedule 210 from the network manager 104. The data controller 108 may then transmit polling requests 212 to the wireless node 110 according to the polling request schedule 210. The wireless node 110 may receive one of the data polling request messages, send a polling response including sensor data, and enters a low-power state.

The data controller 108 may receive the polling response and generate a receipt time at which the polling response is received by the data controller 108. The time may be determined by one or more clocks of the data controller 108. In some embodiments, the clock of the data controller 108 is synchronized with a master clock of the network manager 104. The data controller 108 may then transmit a controller response 216 to the network manager 104, the controller response 216 including the polling response 214 and the receipt time.

The network manager 104 may receive the controller response 216. Such controller response 216 may be used by the network manager 104 for coordinating a subsequent polling request schedule. The network manager 104 may consider the receipt time as the start of the low-power state wireless node 110. The network manager 104 then schedules the second series of data polling request messages prior to the start of the active state of the wireless node. The schedule may be based on the sleep duration of the wireless node 110, a tolerance of the wireless node timing circuit, and the receipt time. Furthermore, the sensor data may be provided to various aircraft applications 102.

A second batch of polling requests may then be sent from the data controller 108 to the wireless node 110, according to the second polling request schedule. For example, FIG. 2 depicts a second batch of polling request 212a, polling request 212b, and polling request 212c. The polling requests 212a and polling request 212b are not received by the wireless node 110. In some instances, the polling request 212a and polling request 212b are not received by the wireless node 110 because the wireless node 110 is in the sleep duration such that the transceiver of the wireless node 110 is not currently in an active state. The network manager 104 may have scheduled the polling requests 212a and polling request 212b during the low-power state, because an actual time drift associated with the timing circuit of the wireless node 110 is unknown by the network manager 104.

The wireless node 110 transitions into a second active state after the sleep duration and waits to receive one of the second batch of data polling request. The polling request 212c may be received by the wireless node 110 (i.e., by way of the transceiver during the wake duration). In response to receiving the polling request 212c, the wireless node 110 may generate sensor data by the sensor. The wireless node 110 may then transmit a polling response 214 including the sensor data to the data controller 108 by way of the transceiver. Subsequent to transmitting the polling response 214, the wireless node 110 may be put into sleep mode. Where the timing circuit is configured with the fixed wake cycle, the wireless node 110 may transmit the polling response 214 at the end of the wake duration or prior to the end of the wake duration. Where the timing circuit is configured with the variable wake cycle, the wireless node 110 may transmit the polling response 214 immediately upon measurement by the sensor. In this regard, the wireless node 110 may be put into sleep mode before the wake duration has expired. This may be advantageous in reducing a power consumption of the wireless node 110.

The data polling request and response sequence is then continued for a desired number of duty cycles of the wireless node 110. The network manager 104 may adapt and generate the polling request schedules for any number (N) of duty cycles. In some embodiments, the duty cycles may continue throughout a flight of an aircraft.

Furthermore, although FIG. 2 depicts a wireless node 110 and a data controller 108, this is not intended as a limitation on the present disclosure. In this regard, FIG. 1 depicts the network 106 with a plurality of data controllers 108, with each data controller 108 including a cluster 112 with a plurality of wireless nodes 110. The network manager 104 may generate the polling request schedule 210 for such network 106.

Figure 3A:
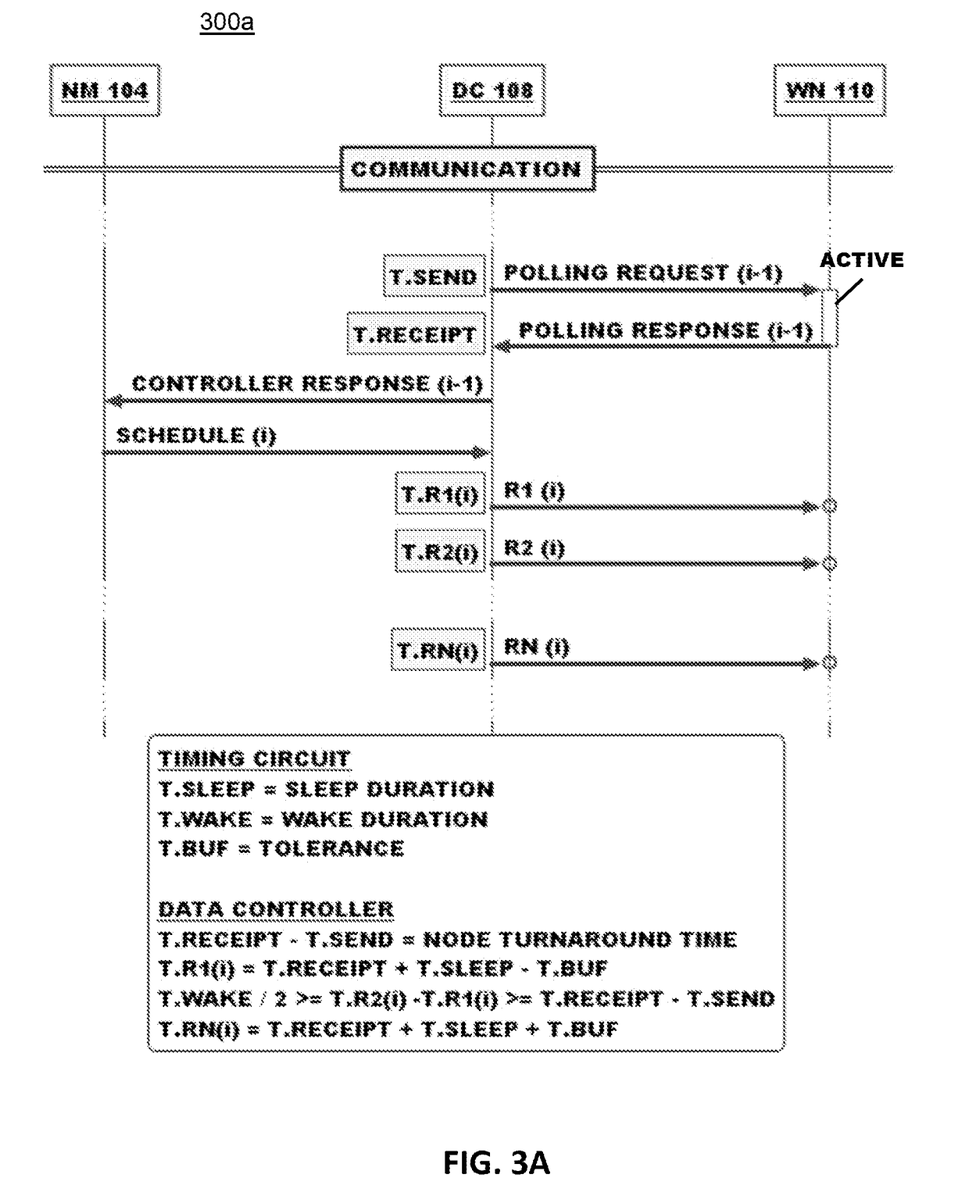
FIG. 3A depicts a sequence diagram 300a showing adaptive scheduling of polling requests for a wireless node with a variable wake cycle, in accordance with one or more embodiments of the present disclosure.
Figure 3B:
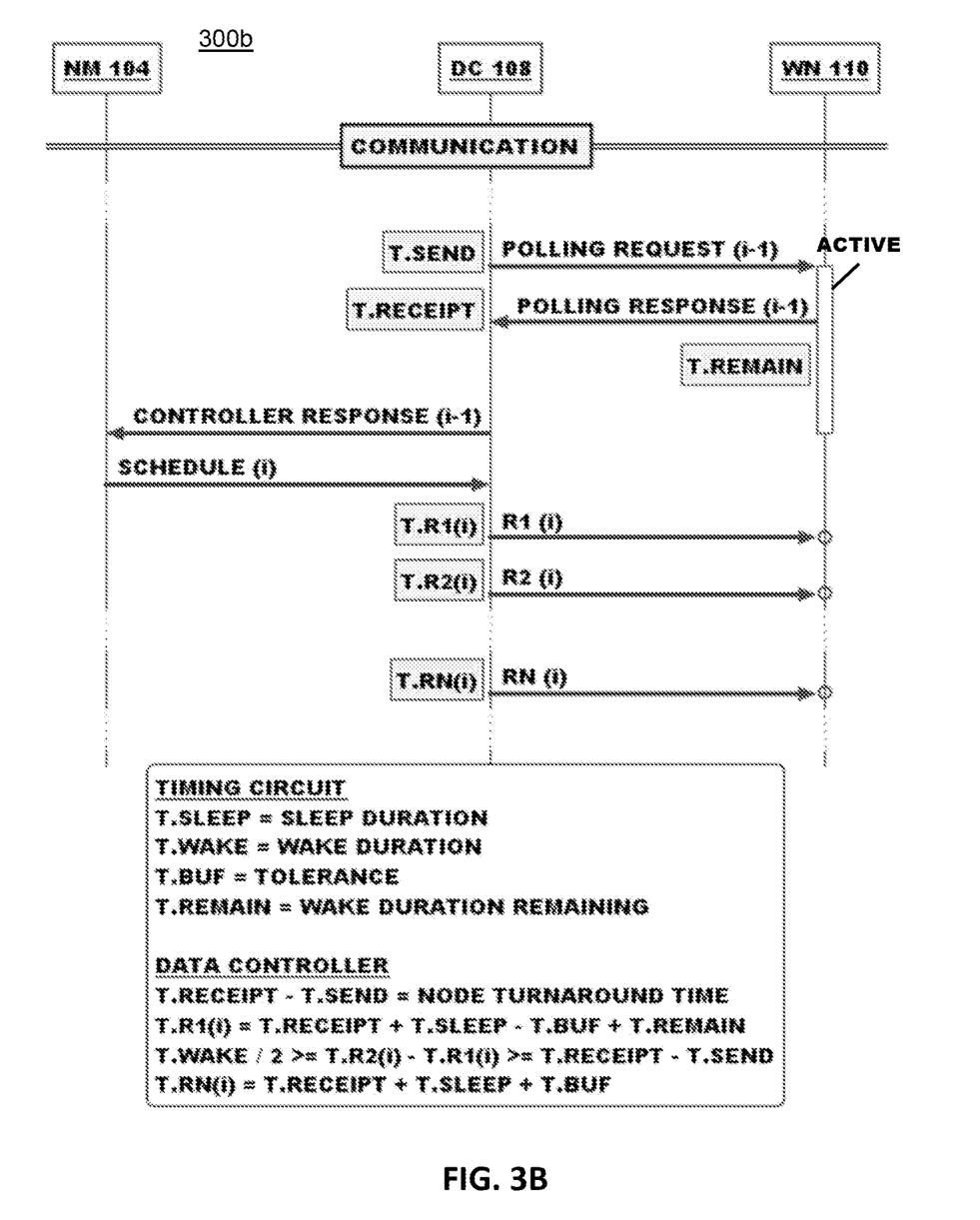
FIG. 3B depicts a sequence diagram 300b showing adaptive scheduling of polling requests for a wireless node with a fixed wake cycle, in accordance with one or more embodiments of the present disclosure.

Referring now to FIGS. 3A-3B, sequence diagrams 300a and 300b are described, in accordance with one or more embodiments of the present disclosure. The sequence diagrams 300a and 300b may depict one or more methods of accounting for timing drift by an algorithm. The algorithm of the network manager 104 for determining the schedule of polling requests may consider variations in the time behavior of the wireless node 110, thereby accounting for timer drifts in the wake duration or the sleep duration.

The wireless node 110 may include a turnaround time. The turnaround time may indicate a time between a polling request which is received by the wireless node 110 to a response at the data controller. In some embodiments, the turnaround time is a fixed turnaround time. The fixed turnaround time may be determined empirically based on the type of the wireless node. Such fixed turnaround time may be stored in a configuration file of the network manager 104. In some embodiments, the turnaround time is a variable turnaround time. The variable turnaround time may be based on timer drift analysis for previous turnaround times between the data controller 108 and the wireless node. For example, FIGS. 3A-3B depict the node turnaround time based on the immediately previous (i−1) node turnaround time (e.g., T. RECEIPT(i−1)−T. SEND(i−1)=Node Turnaround Time). The variable node turnaround time may be similarly based on multiple historical turnaround times between the data controller 108 and the wireless node 110. In some embodiments, the variable turnaround time is adapted from the fixed turnaround time.

The timing circuit of the wireless node 110 may include a tolerance (T.BUF). The tolerance may be based on statistics of the error associated with the timing circuit.

The network manager 104 may schedule a series of polling request messages R1 to RN. The polling requests may be scheduled such that a time window between any two polling requests is at least equal to the turnaround time. In this regard, the wireless node 110 will have sufficient time to respond to the previous polling request before the next polling request is sent. Advantageously, scheduling the polling requests within this time window may reduce channel congestion. Additionally, the time window may be less than or equal to half of the wake duration. Providing polling requests at a higher rate than wireless node's wake duration may allow the wireless node 110 to receive the polling request without the awake state of the wireless node falling between sequential polling requests. For example, FIGS. 3A-3B depict T.WAKE/2>=T.R2(i)−T.R1(i)>=T.RECEIPT− T.SEND. Although the window between any successive requests is described as being contained within this boundary, such boundary is not intended as a limitation on the present disclosure. In this regard, a minimum time between successive requests may be reduced, at a cost of channel congestion.

The schedule for the current duty cycle (i) may include a series of request R1 to RN based on the previous time at which the polling response from the wireless node 110 is received (T.RECEIPT).

After the completion of the previous duty cycle (i−1), a first polling request R1(i) for the current duty cycle (i) starts at a time T.R1(i). The time T.R1(i) of the first polling request may be based on the receipt time of the previous polling response, the sleep duration of the timing circuit, and the tolerance of the timing circuit. For example, FIG. 3A depicts T.R1(i)=T.RECEIPT+T.SLEEP−T.BUF. In some embodiments, the timing circuit is configured with a fixed wake cycle. Where the timing circuit is configured with a fixed wake cycle, the timing circuit may include a remaining wake duration T.REMAIN after transmitting the polling response. The remaining wake duration may be transmitted with the polling response. The network manager 104 may account for the remaining wake duration, such that the time of the first polling request for the current duty cycle (i) may also be based on the wake duration. For example, FIG. 3B depicts T.R1(i)=T.RECEIPT+T.SLEEP−T.BUF+T.REMAIN.

Similarly, a final polling request RN(i) for the current duty cycle (i) may be based on the receipt time of the previous polling response, the sleep duration of the timing circuit, and the tolerance of the timing circuit. For example, FIG. 3A depicts T.RN(i)=T.RECEIPT+T.SLEEP+T.BUF. In some embodiments, the timing circuit is configured with a fixed wake cycle. Where the timing circuit is configured with a fixed wake cycle, the timing circuit may include the remaining wake duration (e.g., T.REMAIN) after transmitting the polling response. The network manager 104 may account for the remaining wake duration, such that the time of the final polling request for the current duty cycle (i) may also be based on the wake duration. For example, FIG. 3B depicts T.RN(i)=T.RECEIPT+T.SLEEP+T.BUF+T.REMAIN.

Based on the above, a duration between the first polling request R1(i) and the final polling request RN(i) of the duty cycle (i) may be based on the wake duration and twice the tolerance of the timing circuit. For example, T.RN(i)−T.R1 (i)=T.WAKE+2*T.BUF.

As may be understood, the various formulas provided herein are not intended to be limiting, unless otherwise provided. Modifications may be made to the formulas while still performing adaptive scheduling of the polling requests based on the timing receipt, the sleep duration, or the tolerance, among others.

The network manager 104 may schedule polling requests for multiple data controllers 108, multiple nodes 110, or multiple clusters 112. Polling request scheduling for each wireless node 110 is handled based on respective wake durations of the wireless nodes 110.

Figure 4:
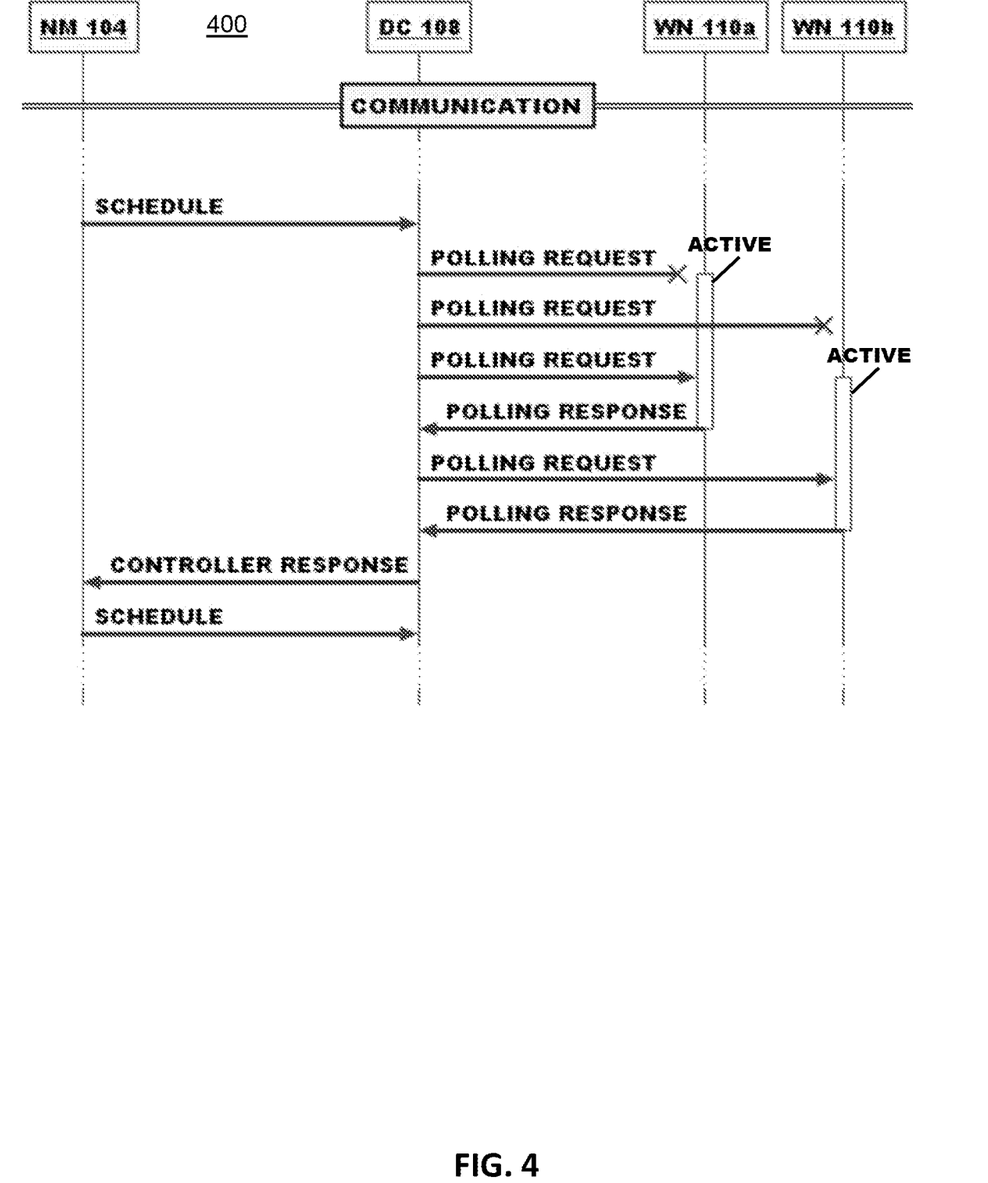
FIG. 4 depicts a sequence diagram 400 showing scheduling polling request for multiple network nodes in a cluster, in accordance with one or more embodiments of the present disclosure.

Referring now to FIG. 4, a sequence diagram 400 is described, in accordance with one or more embodiments of the present disclosure. The sequence diagram 400 may illustrate a method of scheduling for multiple wireless nodes.

In some embodiments, the cluster 112 may include multiple wireless nodes 110. Each wireless node 110 may include a wake duration. The network manager 104 may schedule the data polling requests for each of such wireless nodes 110. In some instances, the active states of the wireless nodes 110 may at least partially overlap. When the network manager 104 has to schedule data polling request messages for multiple wireless nodes 110 due to wake cycles of multiple nodes occurring at a same or similar time, a sequential scheduling method may be used to sequence the requests. For example, a wireless node 110a and a wireless node 110b may wake up at a similar time, such that the active state of the wireless node 110a and the active state of the wireless node 110b may at least partially overlap. The network manager 104 may generate the polling request schedule such that the polling requests from the data controller 108 do not overlap in a transmission channel. In this regard, the polling request transmitted to the wireless node 110a and the polling requests transmitted to the wireless node 110b may be sequential. Such sequential transmission may be advantageous such that each wireless node 110 may receive polling requests during the active state.

Figure 5:
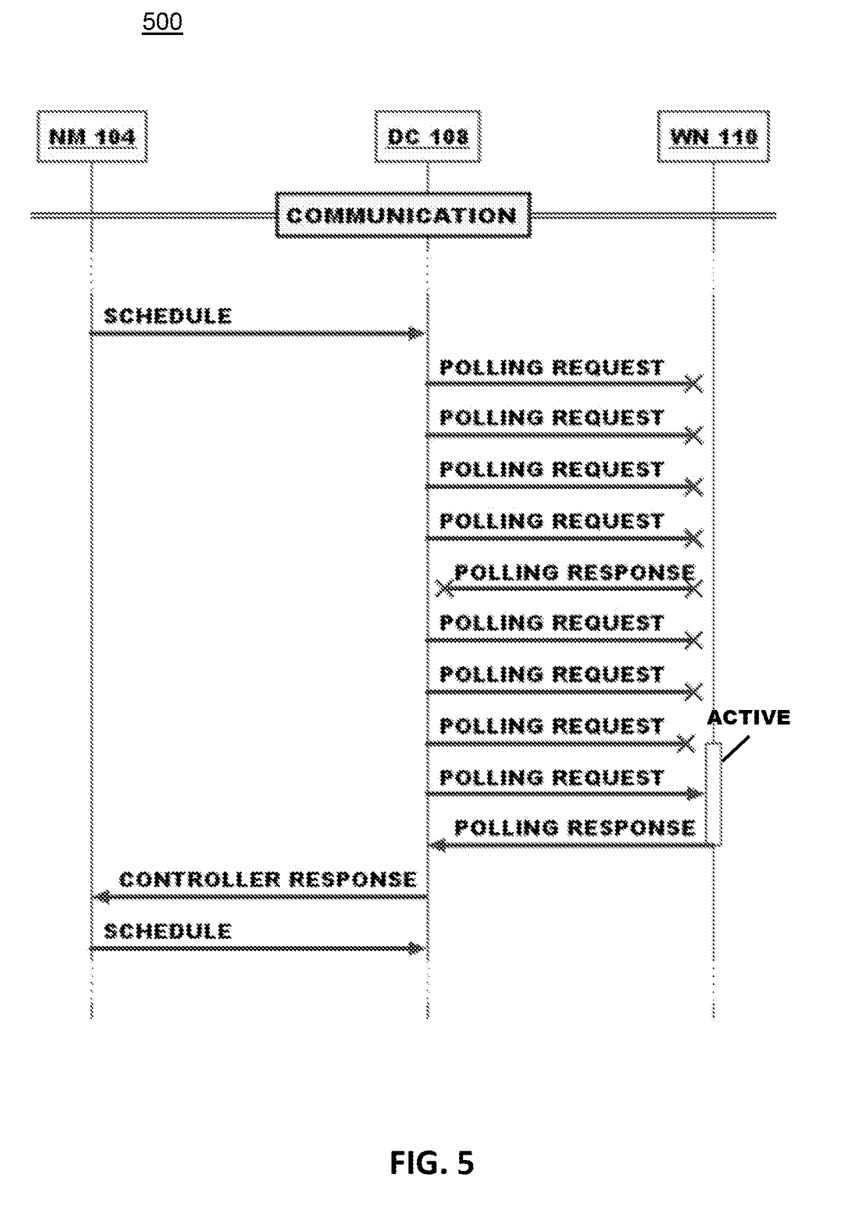
FIG. 5 depicts a sequence diagram 500 showing polling request retransmission, in accordance with one or more embodiments of the present disclosure.

Referring now to FIG. 5, a sequence diagram 500 is described, in accordance with one or more embodiments of the present disclosure. The sequence diagram 500 may illustrate a method of wireless node re-synchronization.

Wireless nodes 110 may lose synchronization with the network manager 104. For example, the wireless nodes 110 may lose synchronization for various reasons, such as, during longer operations, by delays in the wireless node 110, or a momentary reset of the wireless node 110. When the wireless node 110 loses synchronization with the network manager 104, the data controller 108 does not receive the polling response in response to the polling requests. In some embodiments, additional polling requests may be retransmitted to the wireless node 110. The additional polling requests may be transmitted with an interval similar to that set forth in the schedule from the network manager. The wireless node 110 may receive a polling request of the additional polling requests and transmit the sensor data. The controller response including the polling response together with a receipt time may then be transmitted to the network manager 104. The network manager may then generate a subsequent polling request schedule for the wireless node 110 based on the time of receipt of the sensor data, per the adaptive message scheduling previously described herein. By continuing the additional polling requests the data controller 108 may resynchronize with the wireless node 110, at the cost of taking up the wireless channel. In the event that no response is received from the wireless node 110 to the data controller 108 for a time, polling request scheduling may be stopped for that wireless node 110. The polling request scheduling may be stopped until the wireless node is re-associated with a data controller of the network 106.

Figure 6:
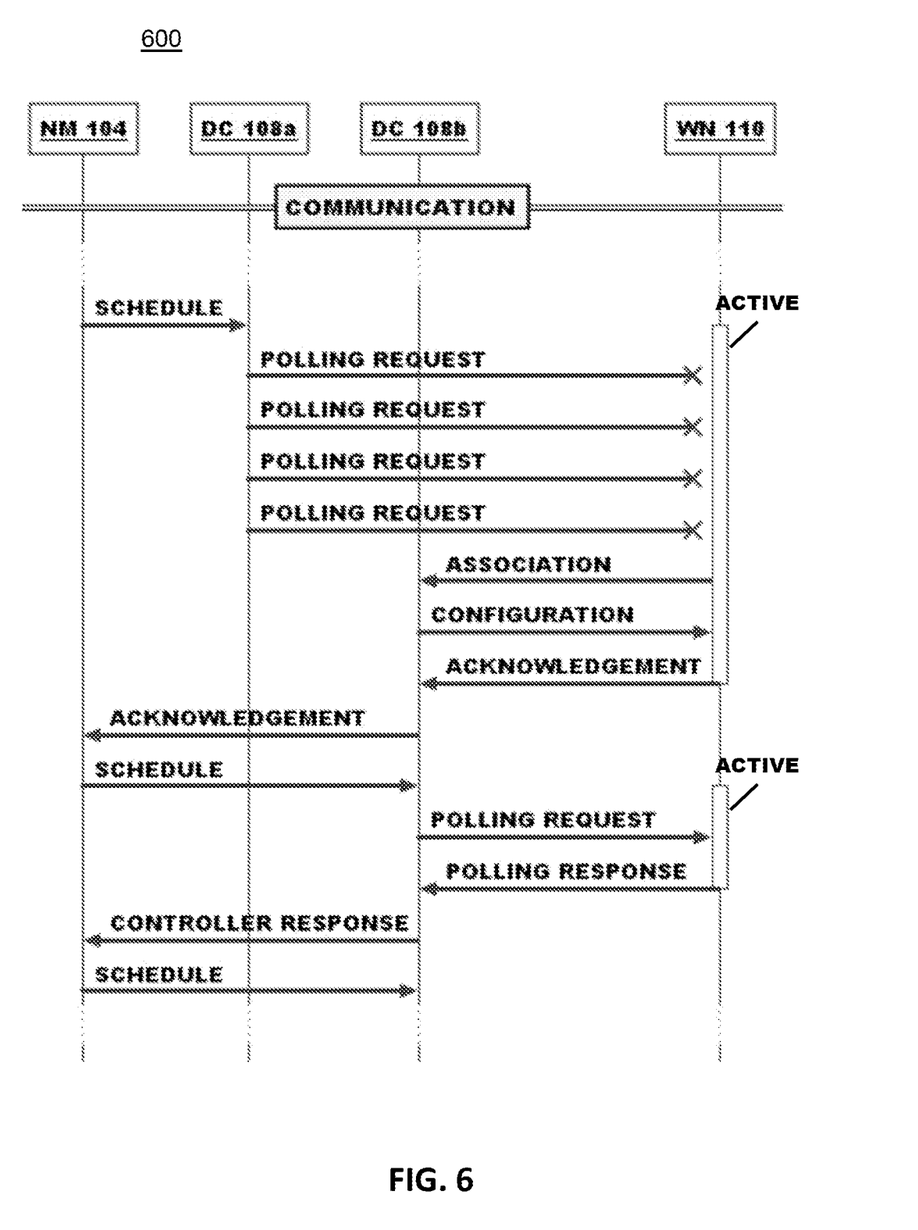
FIG. 6 depicts a sequence diagram 600 showing wireless node re-association, in accordance with one or more embodiments of the present disclosure.

Referring now to FIG. 6 a sequence diagram 600 depicting a method for reassociating wireless nodes is described, in accordance with one or more embodiments of the present disclosure. A timeout may occur at the network manager 104 or the data controller 108. Various scenarios may require the data controller 108 or the network manager 104 to re-associate the wireless nodes 110. Such scenarios may include, but are not limited to, power loss at the network manager 104, power loss at the data controller 108, reset of the network manager 104, or reset of the data controller 108. Depending upon the communication loss, the data controller 108 may re-establish either the cluster 112 or the network manager 104 may re-establish the network 106. In these cases, data requests will not be received from the network manager 104 to the wireless nodes 110.

The following operations may be performed as part of the re-association process. The wireless node 110 may be currently associated with the data controller 108a. If the wireless node 110 does not receive any data request from the data controller 108a during the wake duration (e.g., TON), the wireless node 110 may attempt to associate with a next available data controller, such as the data controller 108b. The wireless node 110 may transmit the association request to the data controller 108b. The data controller 108b may authenticate the wireless node 110 based on the association request and a wireless node identification portion of a configuration message received from the network manager 104. Upon successful authentication, the data controller 108b may transmit the configuration message to the wireless node 110 and await an acknowledgement. Adaptive message scheduling, polling requests, and sensor data communication may then commence. As depicted in FIG. 6, the wireless node 110 may remain in the active state past the wake duration for reassociation purposes. Alternatively, the wireless node 110 may reassociate during the next active state. However, remaining in the active state past the wake duration may be advantageous in more rapidly reassociating the wireless node 110 and similarly receiving the sensor data.

Referring generally again to FIGS. 1-6.

The herein described methods may improve a communication reliability of wireless sensor networks with battery powered elements through time synchronization and adaptive message scheduling. The methods may support low data rate, low duty cycle operations of energy conservative wireless nodes with nano-powered timers. The time synchronization may be initialized by configuring a duty cycle of the wireless nodes. A reduction of radio frequency emissions from data controllers may occur through a selection of optimal time windows and data polling rates, thereby reducing channel congestion. By reducing channel congestion, the wireless sensor network may be scaled to include a greater number of wireless nodes.

The various methods provided herein may be adopted for wireless Health Monitoring applications within an aircraft, such as Integrated vehicle health management (IVHM), Prognostics and Health Management (PHM), System Health Management (SHM), Airplane Health Management (AHM), Engine Health Management (EHM), among others. Although example embodiments of the present disclosure are shown and described in an aircraft environment, the inventive concepts of the present disclosure may be configured to operate in any wireless networking known in the art. In the interest of simplicity and to most clearly define the inventive concepts of the present disclosure, embodiments may be described throughout the present disclosure in an aircraft environment. However, these references are not to be regarded as limiting. Thus, references to "aircraft" or "aviation," and like terms should not be interpreted as a limitation on the present disclosure, unless noted otherwise herein.

The herein described systems illustrates different components contained within, or connected with, other components by the network. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to wirelessly interactable and/or wirelessly interacting components and/or logically interacting and/or logically interactable components.

One or more components of the architecture 100 may include a processor, such as, but not limited to, the network manager 104. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory).

The processor may be configured to execute a set of program instruction maintained on a memory medium. The memory may include any storage medium known in the art suitable for storing program instructions executable by the associated processor. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. In one embodiment, the memory medium may be located remotely with respect to the physical location of the one processor. By executing the program instructions, the processor may execute any of the various process steps described throughout the present disclosure, such as, but not limited to adaptive scheduling of polling requests.

The methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s)

described herein. In addition, each of the embodiments of the method described above may be performed by any of the systems described herein. It is to be noted that the specific order of steps in the foregoing disclosed methods are examples of exemplary approaches. Based upon design preferences, it is understood that the specific order of steps in the method can be rearranged while remaining within the scope of the present disclosure.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting. Furthermore, the various geometries depicted in the accompanying figures are not intended to be limiting and that various modifications are contemplated.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A wireless sensor network comprising:
   a wireless node including a sensor, a transceiver, a battery, and a timing circuit, wherein the timing circuit includes a duty cycle including a sleep duration during which the wireless node is in a low-power state and a wake duration during which the wireless node is in an active state, wherein during the active state the wireless node is configured to receive a polling request by the transceiver, generate sensor data by the sensor, and transmit the sensor data by the transceiver;
   a data controller including a reference clock, the data controller configured to transmit a plurality of polling requests to the transceiver of the wireless node, the plurality of polling requests including the polling request received by the transceiver during the active state, wherein the plurality of polling requests are transmitted according to a polling request schedule, the data controller further configured to receive the sensor data transmitted by the transceiver and generate a receipt time for the sensor data by the reference clock; and
   a network manager, the network manager configured to bi-directionally communicate with the data controller, the network manager further configured to transmit a first configuration message to the data controller for initializing the data controller and the wireless node, the network manager further configured to adaptively generate the polling request schedule for the plurality of polling requests based on at least the receipt time, the sleep duration of the wireless node, and a tolerance of the timing circuit.

2. The wireless sensor network of claim 1, wherein initializing the data controller and the wireless node comprises:
   transmitting, to the data controller:
      the first configuration message from the network manager, the first configuration message including at least a wireless node identification, the wake duration, and the sleep duration; and
      an association request from the wireless node;
   authenticating, by the data controller, the wireless node based on the wireless node identification and the association request;
   transmitting a second configuration message from the data controller to the wireless node, the second configuration message including at least the wake duration and the sleep duration;
   configuring the timing circuit of the wireless node based on the wake duration and the sleep duration; and
   transmitting an acknowledgement message from the wireless node to the data controller.

3. The wireless sensor network of claim 2, further comprising an additional data controller; wherein the wireless node is further configured to transmit an additional association request to the additional data controller when no polling requests are received by the wireless node during the active state for reassociating the wireless node with the wireless sensor network.

4. The wireless sensor network of claim 1, wherein the duty cycle of the wireless node is a fixed duty cycle such that the wireless node remains in the active state for the wake duration subsequent to transmitting the sensor data.

5. The wireless sensor network of claim 4, wherein the polling request schedule is based on the receipt time, the sleep duration, the tolerance of the timing circuit, and a remaining wake duration from a previous duty cycle.

6. The wireless sensor network of claim 4, wherein the first configuration message includes the fixed duty cycle, wherein the wireless node is configured with the fixed duty cycle according to the first configuration message.

7. The wireless sensor network of claim 1, wherein the duty cycle of the wireless node is a variable duty cycle such that the wireless node transitions from the active state to the low-power state after the wireless node transmits the sensor data.

8. The wireless sensor network of claim 7, wherein the first configuration message includes the variable duty cycle, wherein the wireless node is configured with the variable duty cycle according to the first configuration message.

9. The wireless sensor network of claim 1, wherein a duration between successive polling requests of the polling requests is less than or equal to one-half the wake duration.

10. The wireless sensor network of claim 1, wherein the wireless node includes a turnaround time based on a time in which a successful polling request is sent from to the wireless node and a time in which the sensor data is received; wherein a duration between successive polling requests of the polling requests is greater than or equal to the turnaround time of the wireless node.

11. The wireless sensor network of claim 1, wherein a duration between a first polling request of the polling request schedule and a last polling request of the polling request schedule is based on the wake duration and twice the tolerance of the timing circuit.

12. The wireless sensor network of claim 1, wherein the timing circuit comprises a nano-power timing circuit such that the nano-power timing circuit uses less than one-thousand nanowatts of power during the low-power state.

13. The wireless sensor network of claim 1, further comprising an additional wireless node including an additional transceiver, an additional sensor, and an additional timing circuit; the additional timing circuit including an additional wake duration and an additional sleep duration; wherein the wireless node and the additional wireless node are configured in a cluster of the data controller; wherein the data controller is further configured to transmit additional polling requests to the additional wireless node by a wireless connection with the additional transceiver; wherein the data controller is further configured to receive additional sensor data from the additional sensor by the wireless connection with the additional transceiver.

14. The wireless sensor network of claim 13, wherein the wake duration of the wireless node and the additional wake duration of the additional wireless node at least partially overlap.

15. The wireless sensor network of claim 14, wherein the network manager generates the polling request schedule such that the polling requests and the additional polling requests do not overlap.

16. The wireless sensor network of claim 1, wherein the data controller is configured to retransmit the polling requests until the sensor data is received by the data controller.

17. A method comprising:
transmitting, to a data controller:
a first configuration message from a network manager, the first configuration message including at least a wireless node identification, a wake duration, and a sleep duration; and
an association request from a wireless node;
authenticating, by the data controller, the wireless node based on the wireless node identification and the association request;
transmitting a second configuration message from the data controller to the wireless node, the second configuration message including at least the wake duration and the sleep duration;
configuring a duty cycle of a timing circuit of the wireless node based on at least the wake duration and the sleep duration, wherein the wireless node is in a low-power state during the sleep duration, wherein the wireless node is in an active state during the wake duration; and
transmitting an acknowledgement message from the wireless node to the data controller;
the method further comprising:
generating, by the network manager, a polling request schedule, the polling request schedule based on at least a receipt time at which sensor data is received by the data controller, the sleep duration of the wireless node, and a tolerance of the timing circuit;
transmitting a plurality of polling requests from the data controller to the wireless node, the plurality of polling requests transmitted according to the polling request schedule;
receiving, to the wireless node, a polling request of the plurality of polling requests during the active state of the wireless node; and
transmitting, to the data controller from the wireless node, the sensor data generated by a sensor of the wireless node.

18. The method of claim 17, wherein the second configuration message further includes a variable duty cycle or a fixed duty cycle; wherein the timing circuit is configured with either the variable duty cycle or the fixed duty cycle.

19. The method of claim 17, further comprising:
receiving an additional association request from an additional wireless node, the additional association request including an identification of the additional wireless node;
rejecting, by the data controller, the additional wireless node based on the wireless node identification and the additional association request.

* * * * *